(12) United States Patent
Miranda et al.

(10) Patent No.: US 10,896,605 B2
(45) Date of Patent: Jan. 19, 2021

(54) COMMUNICATION SYSTEM FOR TRAFFIC CONTROL EQUIPMENT

(71) Applicants: Juan Manuel Miranda, Toronto (CA); Daniel Ernesto Miranda, Toronto (CA)

(72) Inventors: Juan Manuel Miranda, Toronto (CA); Daniel Ernesto Miranda, Toronto (CA)

(*) Notice: Subject to any disclaimer, the term of this patent is extended or adjusted under 35 U.S.C. 154(b) by 0 days.

(21) Appl. No.: 16/752,162

(22) Filed: Jan. 24, 2020

(65) Prior Publication Data
US 2020/0175858 A1 Jun. 4, 2020

(30) Foreign Application Priority Data

Feb. 21, 2019 (CA) .................................. 3034485

(51) Int. Cl.
| | | |
|---|---|---|
| *G08G 1/07* | (2006.01) | |
| *G08G 1/081* | (2006.01) | |
| *G08G 1/01* | (2006.01) | |
| *G08G 1/095* | (2006.01) | |
| *G08G 1/0967* | (2006.01) | |

(52) U.S. Cl.
CPC ........... *G08G 1/081* (2013.01); *G08G 1/0145* (2013.01); *G08G 1/095* (2013.01); *G08G 1/096716* (2013.01)

(58) Field of Classification Search
CPC ................. G08G 1/081; G08G 1/0962; G08G 1/096725; G08G 1/096783; G08G 1/095; G08G 1/096758; G08G 1/0145; G08G 1/096716
See application file for complete search history.

(56) References Cited

U.S. PATENT DOCUMENTS

| | | | | |
|---|---|---|---|---|
| 5,635,920 A | * | 6/1997 | Pogue | G08G 1/096716 340/901 |
| 6,965,321 B1 | * | 11/2005 | Arab | G08G 1/0962 340/693.6 |
| 9,881,501 B2 | * | 1/2018 | Weber | G08G 1/096758 |
| 10,755,562 B2 | * | 8/2020 | Martinez Openiano | G08G 1/07 |
| 2005/0187701 A1 | * | 8/2005 | Baney | G08G 1/096716 701/117 |
| 2009/0115632 A1 | * | 5/2009 | Park | G08G 1/096775 340/905 |
| 2017/0178507 A1 | * | 6/2017 | Yokochi | G08G 1/096716 |

\* cited by examiner

*Primary Examiner* — Toan N Pham

(57) ABSTRACT

A traffic control system consisting of sets of traffic lights each capable of energizing a red, yellow or green traffic light in accordance with the commands issued by an electric traffic controller. The traffic controller being operatively coupled to at least one infrared transmitter configured to send out coded binary infrared signals which are coordinated to match the traffic mode of the associated traffic lights. The infrared signals being beamed by the infrared transmitter to the vehicular traffic in front of the corresponding traffic light. One or more of these vehicles having an infrared receiver coupled to an LED display, the LED display capable of displaying a red, yellow or green light. The infrared receiver configured to decode the coded binary signals sent by the infrared transmitter and capable to activate a LED light in the vehicle display that will match the color of the corresponding traffic light that is energized at any given time.

3 Claims, 5 Drawing Sheets

COMMUNICATION SYSTEM FOR TRAFFIC CONTROL EQUIPMENT

FIELD OF THE INVENTION

The invention relates generally to vehicular traffic control equipment and in particular to improvements to the way traffic lights and traffic related information are visualized by vehicle drivers.

BACKGROUND OF THE INVENTION

A number of factors may affect the ability of a driver to see the traffic lights at a street intersection clearly, or even read the street name. Examples of elements that may disturb drivers are: a winding road that breaks the line of sight, physical obstacles moving ahead (trucks, busses, cars), bad weather (rain, snow, fog) or light pollution (sunlight, commercial billboards, street lighting). Such conditions may force drivers to apply brakes unnecessarily or may even have more serious safety consequences given the diminished ability of the driver to see the traffic lights clearly and decide whether the vehicle is supposed to go through or to stop at an intersection. The present invention will help drivers overcome these limitations by allowing them to visualize the condition of traffic lights clearly at an approaching intersection. Drivers could also be provided with other traffic related information: street names, speed limit, emergency conditions. The safety benefits of this invention are self-evident.

PRIOR ART

The patent No. CN 21.166201 registered in China on Sep. 23, 1992 by Yang Rui bears some similarities to the present invention however, some important differences may be pointed out:
- The invention submitted by Yang Rui utilizes tone frequencies to transmit information (i.e. color of traffic lights) to the vehicles. Due to the natural conditions of tone frequencies, the type of information that may be transmitted by this invention is quite limited when compared to the possibilities offered by PWM (pulse width modulation) technology used by the present invention. The time required for the processing of tone signals is another factor that may conspire against the use of the Chinese patent.
- A drawing included in the Yang Rui patent shows that the infrared beams that deliver the signals are in a position that is transversal to the traffic flow and therefore lack selectivity. In a two way street, signals could be received by the wrong vehicles which is obviously an undesired consequence of the proposed system.

These two (Ideas may render the Yang Rui invention impractical which would explain why the system was apparently never put into practical use.

In Canada, Juan Miranda and Daniel Miranda have patented recently the same invention described in this application. Please refer to the U.S. Pat. No. 3,034,485—CIPO (Canadian Intellectual Property Office). The submission to the CIPO was made on Feb. 21, 2019.

SUMMARY OF THE INVENTION

In accordance with one aspect of the present invention, there is provided a vehicular traffic control equipment for safely guiding a plurality of cars through a street intersection. The equipment includes a series of traffic lights positioned at the intersection, the lights each capable of controlling the flow of traffic through the intersection by placing a visible traffic light into a plurality of traffic modes including stop and go. Each traffic light is operatively coupled to an electric controller which is responsible for the operation of the traffic lights. The equipment also includes at least one infrared transmitter associated with each traffic light, the infrared transmitter configured to send an infrared beam directed at the vehicular traffic facing the associated traffic light. The infrared transmitter is configured to send a coded binary signal in the infrared beam, the coded signal being different for each traffic mode of the associated traffic light. The controller is configured to operate the infrared transmitter such that the coded signal transmitted by the infrared transmitter is coordinated to the traffic mode of the associated traffic light. Each car has an infrared receiver coupled to an LED display, the LED display capable of displaying audio and/or visual indications equivalent to the traffic modes (or color) of the traffic lights. The infrared receiver is configured to convert the binary infrared signal received from the infrared transmitter into the corresponding visual indication on the LED display.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

BRIEF DESCRIPTION OF THE DRAWINGS

It should be understood that the different elements shown in the appended drawings illustrate typical embodiments of the invention and therefore should not be considered limiting of its scope.

DETAILED DESCRIPTION OF THE INVENTION

Figure 1:
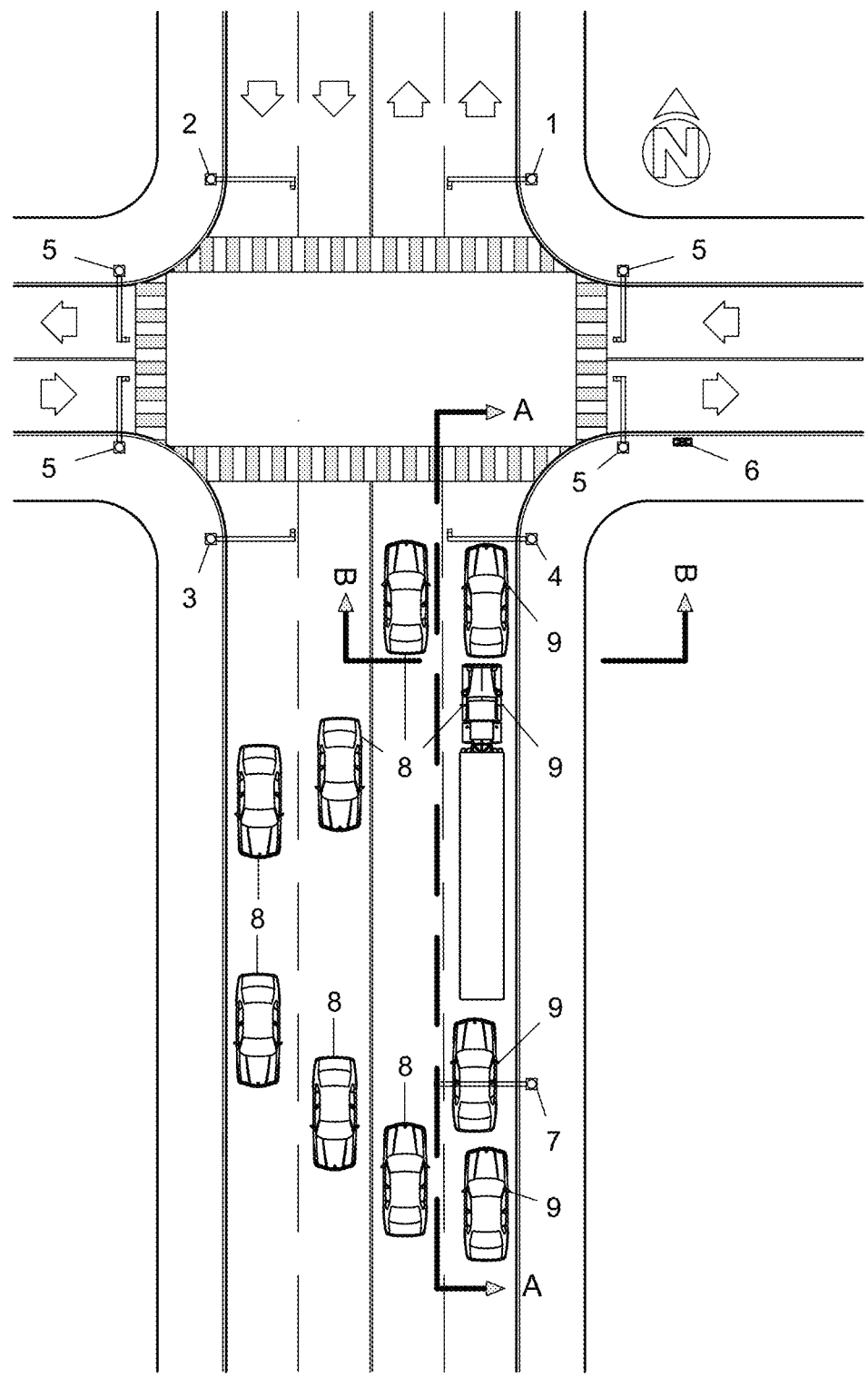
FIG. 1 is a plan view of a typical street intersection according to an exemplary embodiment of the invention.

Referring firstly to FIG. 1, an application of the invention is represented, consisting of a plurality of traffic lights and control mechanisms as typically found at a street intersection which is controlled by traffic lights. Items 1 through 5 represent metallic supports for traffic lights. Item 7 shows the installation of infrared transmitters (IRT) on metallic supports. Transmitters (IRT) are also mounted on item 4. These transmitters (IRT) are a key aspect of the present invention as they are the means by which vehicles are warned as to the state of traffic lights items 1/2 faced by the northbound vehicular traffic. For simplicity, traffic controls for southbound vehicles are not shown on the drawing. Transmitters (IRT) may also be installed on overhead wires laid across the street, over the traffic lanes. Item 6 depicts a cabinet housing the control system (electric controller) of traffic lights. The control system is substantially similar to standard controllers that operate traffic lights in a street intersection. Item 8 represents typical vehicles circulating on the street. Item 9 shows infrared sensors (IRS) installed on different vehicles. These sensors (IRS) are configured to read and interpret the signals beamed by transmitters (IRT), item 4 or 7.

Figure 2:
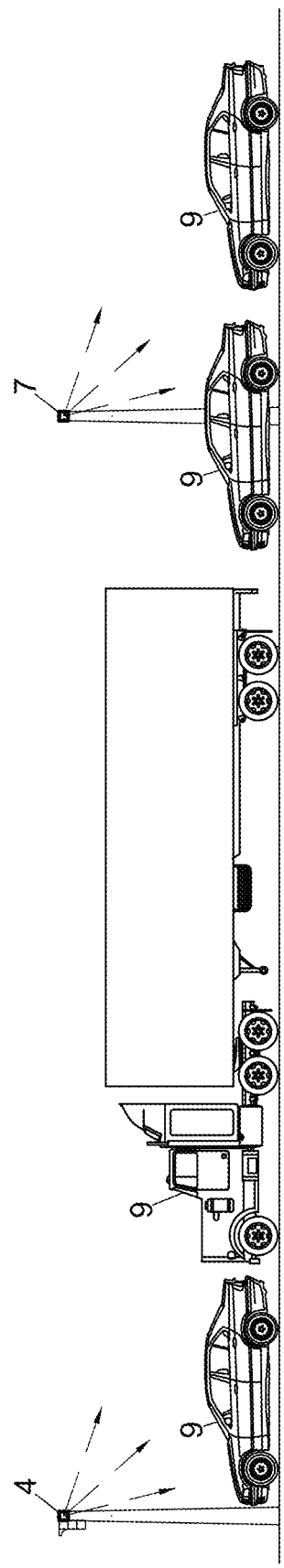
FIG. 2 is a section view (Section AA) of the above FIG. 1.

Referring now to FIG. 2, item 4 represents typical traffic lights installed on a steel structure. The structure of item 4 also supports infrared transmitters (IRT). Item 7 shows the installation of transmitters (IRT) on a steel support. The transmitter (IRT) coupled to traffic light item 4 is operatively coupled to transmitter (IRT) item 7 such that both devices can send the same infrared signals at the same time. Additional transmitters (IRT) may also be installed on overhead wires laid across the street, over the traffic lanes. The transmitters (IRT) on item 4 and item 7 are coupled to the traffic light controller item 6 (see FIG. 1). The controller item 6 and the transmitters (IRT) are configured such that the controller causes transmitters (IRT) to emit infrared binary signals indicative of the condition of traffic lights items 1/2. It will be appreciated that traffic lights items 1/2 can be in several different states, such as green, red, yellow, flashing green, flashing red or some other state as permitted by local traffic laws. Item 9 shows infrared sensors (IRS) installed on different vehicles. It will be noted that transmitter (IRT) item 7 is positioned some distance away from traffic lights item 4 so that vehicles further south can receive signals from at least one transmitter, in this case, (IRT) item 7.

Figure 3:
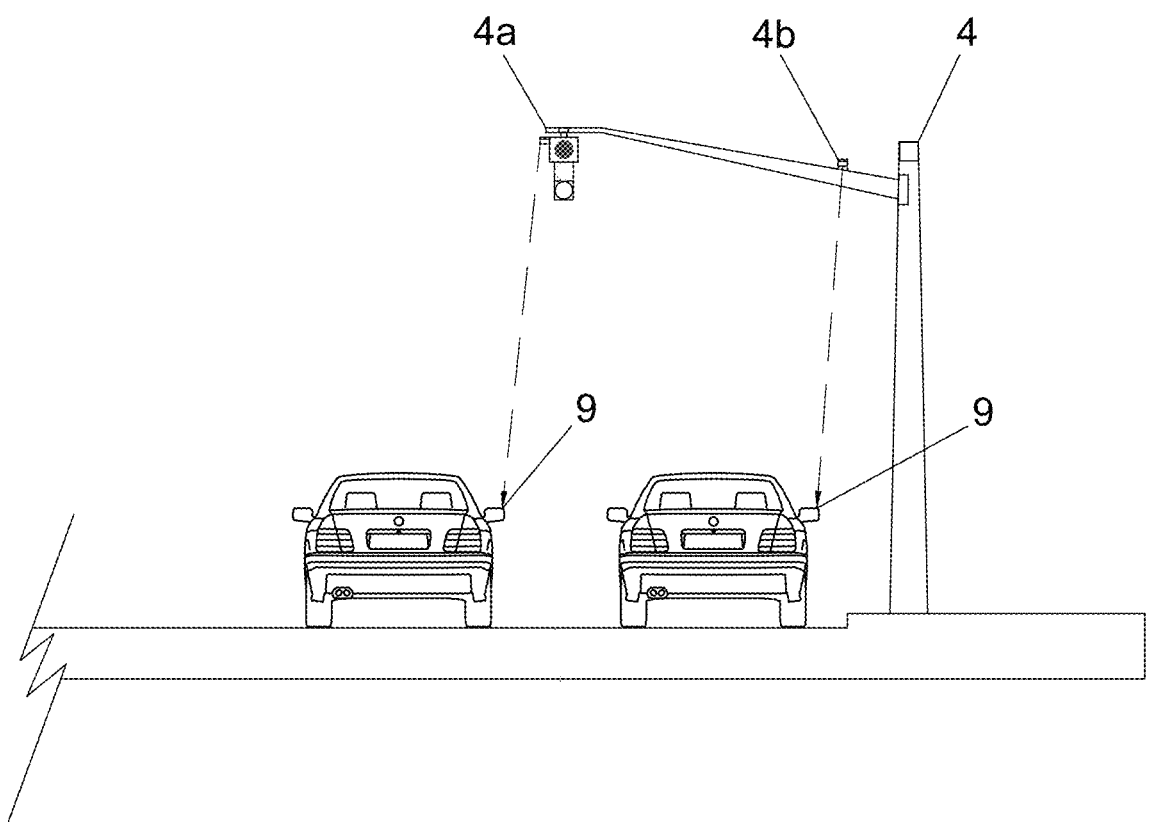
FIG. 3 is a section view (Section BB) of above FIG. 1.

Referring now to FIG. 3, item 4a is a traffic light set installed on a structure support item 4 which consists of a pole and arm (as the case may be). Traffic lights item 4a is modified to include an infrared transmitter (IRT), but it is otherwise identical to traffic lights readily available on the market. The structure of item 4 supports also an additional transmitter (IRT) item 4b. The transmitter (IRT) in traffic lights 4a and transmitter (IRT) item 4b are substantially identical and transmit substantially the same signals in the same way.

Figure 4:
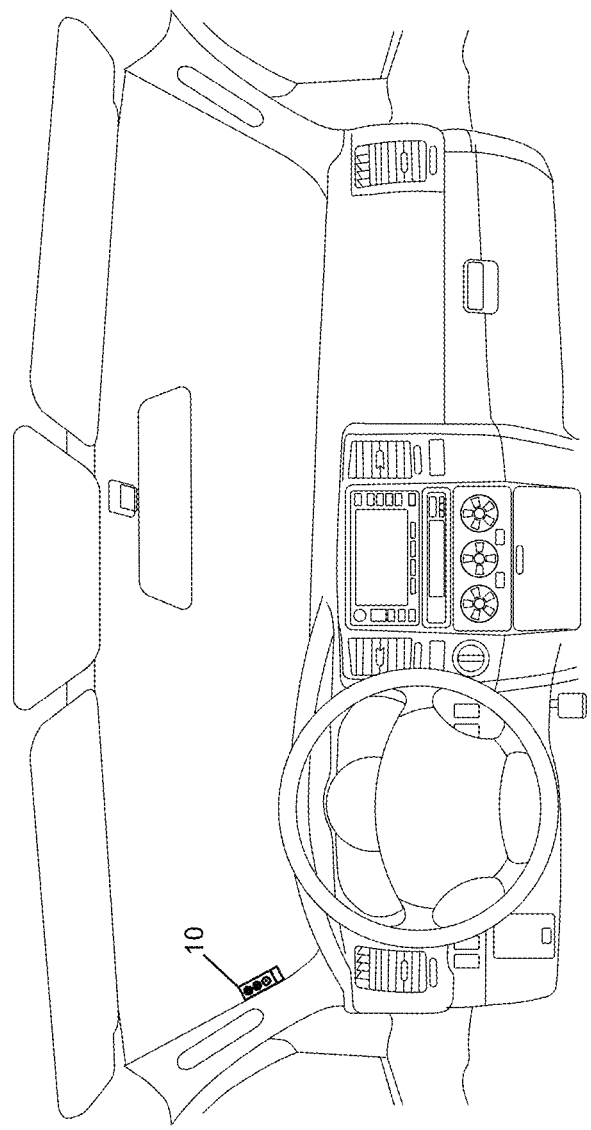
FIG. 4 is a typical view of a vehicle interior according to an exemplary embodiment of the invention.

Referring now to FIG. 4, the electronic display item 10 is shown on a typical arrangement. This device operates as a road information display (RID). The RID is configured to provide indication in accordance with the binary signals emitted by the transmitters (IRT) (see FIGS. 1, 2 and 3) which are received by the infrared sensor (IRS) item 9. Preferably the RID is configured to have three LED: red, yellow and green color, one of which will be activated to indicate the condition of the corresponding traffic light coupled to the transmitting IRT. Other alternative arrangements could be considered for the RID so that additional information is provided: location, max speed, time remaining until the light changes. Display (RID) item 10 is positioned where it will be conspicuous to the driver of the vehicle, preferably adjacent the front windshield so that the driver need not take his/her eyes off the road in order to view the display (RID). The display (RID) could also be incorporated to the vehicle infotainment panel.

Figure 5:
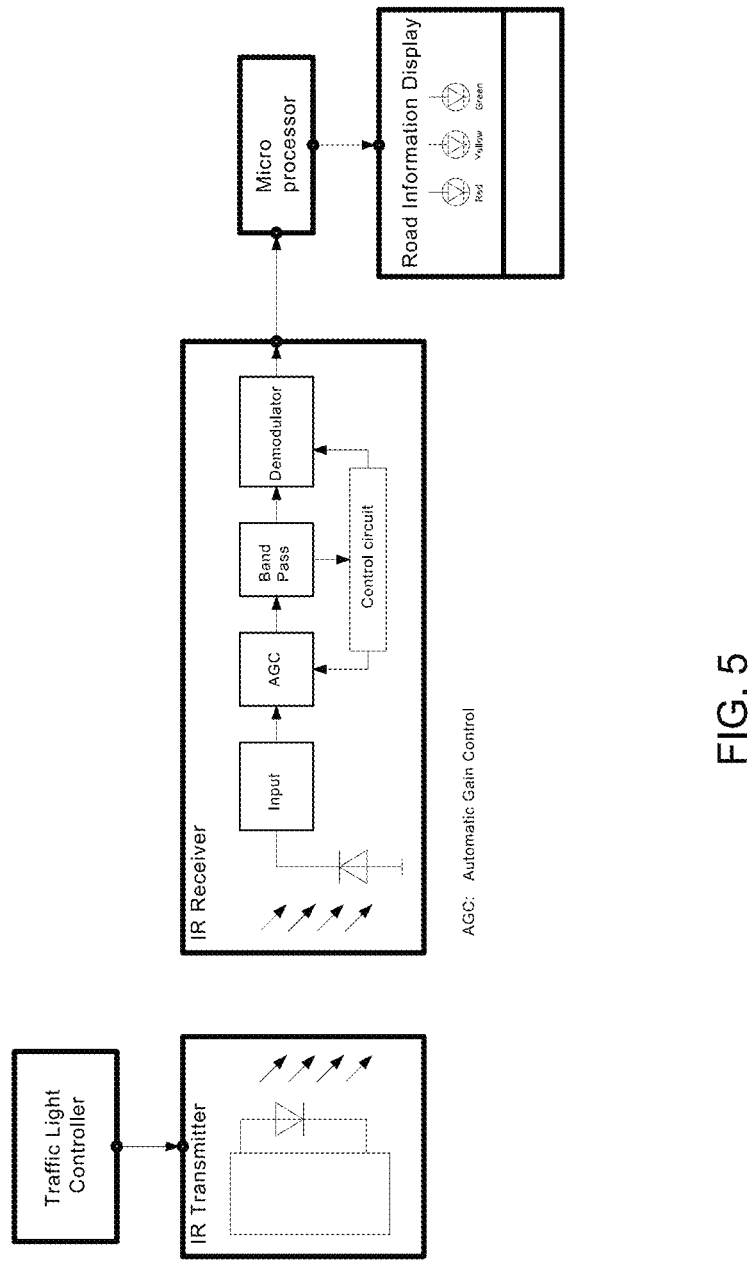
FIG. 5 is a block/logic diagram showing the interconnection of the key elements of the communication system according to an exemplary embodiment of the invention.

FIG. 5 shows a block/logic diagram of the interconnection of the key elements of the invention. The traffic light controller, the infrared transmitter (IRT), the infrared receiver (IRS), the receiver microprocessor or microcontroller and the road information display (RID) are represented. The transmitter (IRT) is coupled to a traffic light controller and is configured to transmit an infrared signal in response to the condition of the traffic lights. If the energized traffic light is green, the IRT is configured to transmit a unique infrared signal with a code to indicate that the green light of the display (RID) should be energized. Analogous infrared signals will correspond to yellow and red lights, and optionally, other traffic light conditions used: advanced green, flashing red (indicating a non-functioning traffic light) or other signals as may be required. The infrared sensor (IRS) is configured to receive the infrared binary signal transmitted by the IRT and demodulate/decode it to determine the current mode of the traffic light (red, yellow, green, advanced green, flashing red). This demodulated/decoded signal is then sent to a microprocessor or microcontroller unit which activates the appropriate indication on the display (RID). The microprocessor or microcontroller would be integral with the receiver (IRS). It will be appreciated that the transmitter (IRT) emits a directional infrared signal requiring line-of-sight alignment with the infrared receiver (IRS) for the receiver to pick up the signal. This condition is not a disadvantage as it allows directionality and selectivity since only those infrared receivers (IRS) which are in the line-of-sight of the transmitter (IRT) will receive the signal. Infrared transmitters (IRT) suitable for use with the present invention are generally available on the marketplace, as are infrared receivers (IRS), microprocessor/microcontroller units, and LED/LQ displays.

The use of the present traffic control communication system will now be discussed in greater detail with reference to FIG. 1.

The traffic light Controller (item 6) will send a signal to energize one light (red, yellow or green) of each traffic light set (items 1 through 5). Simultaneously, an electrical signal will be sent by the Controller (item 6) to each of the infrared transmitters (IRT), items 4 and 7. Upon receiving the signal from the Controller the light emitting diodes of the infrared transmitters (IRT) will emit a beam of infrared light which will contain a binary code (pulse width modulation—PWM, or pulse code modulation—PCM) in accordance with the program that is used. The beams will be directed towards the vehicle sensors (IRS), at the proper locations. Since the beam is directional, only those vehicles in the direct path of the beam will be able to receive and decode the signals sent by the transmitters (IRT), item 4 and item 7. Since transmitter (IRT) item 7 is some distance away from the transmitters at traffic light item 4, even vehicles which are behind obscuring traffic will receive a signal. The infrared sensors (IRS) item 9, on travelling vehicles which are within the line of sight and the range of the infrared transmitters (IRT) will receive the signal sent out by the transmitters (IRT) and will decode it in accordance with the program utilized. In these cases, the message will reach the microprocessor or microcontroller associated with the sensor IRS (see FIG. 5), which will activate a light (red, yellow or green) on the RID display (item 10 in FIG. 4). The light will remain energized as long as the same signal is received by the infrared sensors (IRS) item 9. When the Controller (item 6) sends a signal to energize another color of the traffic lights, the new command will also reach the transmitters (IRT) and then the infrared sensors (IRS). The sensors (IRS) will transmit the command to the microprocessor or microcontroller, allowing it to activate the proper indication on the RID display (item 10 in FIG. 4).

The invention will make it possible for drivers to have a road information display (RID) installed inside their vehicles showing the condition of traffic lights at an approaching street intersection. Furthermore, the display (RID) may provide additional traffic information: street name, location, speed limit, time until the light changes, emergency conditions. The display (RID) will indicate the color of the traffic light that is lit up at the approaching intersection. In this way, the display (RID) will provide alternative information to a driver who sometimes may find it difficult to make visual contact with the oncoming intersection traffic lights.

A specific embodiment of the present invention has been disclosed; however, several variations of the disclosed embodiment could be envisioned as within the scope of this invention. It is to be understood that the present invention is not limited to the embodiments described above, but it encompasses any and all embodiments within the scope of the following claims.

The invention claimed is:

1. A communication system for vehicular traffic control equipment that allows information to be sent from a stationary panel to regular vehicles, comprising:
a series of standard traffic lights positioned at a street intersection, the traffic lights each capable of controlling a flow of traffic through the intersection by placing visible traffic lights into a plurality of traffic modes including stop and go, each traffic light being operatively coupled to an electric controller which regulates the operation of the traffic lights;
at least one infrared transmitter (IRT) associated with each set of traffic lights, the transmitter (IRT) configured to send an infrared beam directed at the vehicles placed in front of the associated traffic lights, the transmitter (IRT) to send a coded binary signal in the infrared beam, the coded binary signal being different for each traffic mode of the associated traffic lights, the electric controller being configured to operate the transmitter (IRT) such that the coded binary signal emitted by the transmitter (IRT) is coordinated to the traffic mode of the associated traffic lights; the transmitters (IRT) sending out beams that operate typically with carrier frequencies in the 35 kHz to 40 kHz range, sending binary pulse width modulation (PWM) or pulse code modulation (PCM) signals;
each vehicle having at least one infrared receiver (IRS) coupled to a microprocessor or microcontroller and to a road information display (RID), the display (RID) capable of providing audio or visual information equivalent to the traffic modes of the traffic lights, the infrared receiver (IRS) and integral microprocessor or microcontroller configured to interpret the coded binary signal in the infrared beam emitted by the transmitter (IRT) and to activate the corresponding audio or visual indication on the display (RID), the display (RID) installed at each vehicle dashboard, within sight of the vehicle driver;
the display (RID) designed to provide the vehicle driver with audio or visual information that has been transmitted via transmitters (IRT) to sensors (IRS) using coded binary signals, the information to include one or more of the following categories:
Color of traffic light that is energized;
Duration of above light or time remaining until the light changes;
Emergency conditions due to fire;
Emergency conditions due to accidents or abnormal conditions;
Emergency conditions due to police activity;
Location information: name of street/avenue at the upcoming intersection;
Location information: name of the city;
Location information: highway name and/or exit number;
Location information: street parking regulations;
Maximum speed allowed;
Interlace with smart phones-app to be developed.

2. A communication system for vehicular traffic control equipment that allows information to be sent from a stationary panel to regular vehicles, trains, ships or airplanes, comprising:
a stationary traffic control panel (TCP) positioned near a street, highway, rail track or runway, the panel (TCP) being operatively coupled to one or more infrared transmitters (IRT);
at least one infrared transmitter (IRT) associated with the panel (TCP), the transmitter (IRT) configured to send infrared beams directed at vehicles, trains, ships or airplanes travelling through a street, highway, rail track or runway, the transmitter (IRT) designed to send coded binary signals in the infrared beam, the coded binary signals being in accordance with the information programmed in the associated panel (TCP), the transmitters (IRT) sending out beams that operate typically with carrier frequencies in the 35 kHz to 40 kHz range, sending binary pulse width modulation (PWM) or pulse code modulation (PCM) signals;
each vehicle, train, ship or airplane having at least one infrared receiver (IRS) coupled to a microprocessor or microcontroller and to a road information display (RID), the display (RID) capable of providing audio and/or visual information equivalent to the data programmed in the panel (TCP), the infrared receiver (IRS) and integral microprocessor or microcontroller configured to receive and interpret the coded binary signals in the infrared beam emitted by the transmitter (IRT) and to activate the corresponding audio or visual indication on the display (RID), the display (RID) installed at each vehicle dashboard or infotainment panel, within sight of the vehicle driver or pilot;
the display (RID) designed to provide the vehicle driver or pilot with audio and/or visual information that has been transmitted via transmitters (IRT) to sensors (IRS) using coded binary signals, the information to include one or more of the following categories:
Stop or Go signal;
Location information: name of approaching street, stop, runway or port;
Location information: name of the city;
Location information: highway name and/or exit number;
Location information: street parking regulations;
Maximum speed allowed;
Emergency conditions due to fire;
Emergency conditions due to accidents or abnormal conditions;
Emergency conditions due to police activity;
Special conditions due to construction or maintenance activities;
Interface with smart phones-app to be developed.

3. A communication system for vehicular traffic control equipment that allows information to be sent from a stationary panel to driverless vehicles, comprising:
a series of standard traffic lights positioned at a street intersection, the lights each capable of controlling a flow of traffic through the intersection by placing visible traffic lights into a plurality of traffic modes including stop and go, each traffic light being operatively coupled to an electric controller which regulates the operation of the traffic lights;
at least one infrared transmitter (IRT) associated with each set of traffic lights, the transmitter (IRT) configured to send an infrared beam directed at the driverless vehicles placed in front of the associated traffic lights, the transmitter (IRT) to send a coded binary signal in the infrared beam, the coded binary signal being different for each traffic mode of the associated traffic lights, the controller being configured to operate the transmitter (IRT) such that the coded binary signal emitted by the transmitter (IRT) is coordinated to the traffic mode of the associated traffic lights; the transmitters (IRT) sending out beams that operate typically with carrier frequencies in the 35 kHz to 40 kHz range, sending binary pulse width modulation (PWM) or pulse code modulation (PCM) signals;

each driverless vehicle having at least one infrared receiver (IRS) coupled to a microprocessor or microcontroller and to an electronic road information display (RID), the display (RID) capable of providing audio and/or visual information equivalent to the traffic modes of the traffic lights, the infrared receiver (IRS) and integral microprocessor or microcontroller configured to interpret the coded infrared signal emitted by the transmitter (IRT) and to activate the corresponding audio and/or visual indication on the display (RID), the display (RID) installed at each vehicle dashboard, within sight of the vehicle driver;

the display (RID) designed to provide the vehicle driver with audio and/or visual information that has been transmitted via transmitters (IRT) to sensors (IRS) using coded binary signals, the information to include one or more of the following categories:

Color of traffic light that is energized;
Duration of above light or time left until the light changes;
Emergency conditions due to fire;
Emergency conditions due to accidents or abnormal conditions;
Emergency conditions due to police activity;
Location information: name of street or avenue at the upcoming intersection;
Location information: name of the city;
Location information: highway name and/or exit number;
Location information: street parking regulations;
Maximum speed allowed;
Interface with smart phones—app to be developed;

the infrared receiver (IRS) coupled to a microprocessor or microcontroller which is designed to provide information to the logic control circuit of the driverless vehicle, the information to include one or more of the following categories:

Color of traffic light that is energized;
Duration of above light or time left until the light changes;
Emergency conditions due to fire;
Emergency conditions due to accidents or abnormal conditions;
Emergency conditions due to police activity;
Location information: name of street or avenue at the upcoming intersection;
Location information: name of the city;
Location information: highway name and/or exit number;
Maximum speed allowed.

* * * * *